(12) United States Patent
Ornelas et al.

(10) Patent No.: US 12,269,394 B2
(45) Date of Patent: Apr. 8, 2025

(54) ADJUSTABLE DEVICE HOLDER

(71) Applicant: Safran Seats USA LLC, Gainesville, TX (US)

(72) Inventors: Luis Eduardo Ornelas, Mexico City (MX); Daniel Abraham Chavarria Garcia, Chihuahua (MX); Gerardo Terriquez, Chihuahua (MX); Teresa del Carmen Antillon, Chihuahua (MX); Andres Jimenez, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 423 days.

(21) Appl. No.: 17/772,112

(22) PCT Filed: Oct. 31, 2019

(86) PCT No.: PCT/US2019/059266
§ 371 (c)(1),
(2) Date: Apr. 26, 2022

(87) PCT Pub. No.: WO2021/086386
PCT Pub. Date: May 6, 2021

(65) Prior Publication Data
US 2022/0371526 A1 Nov. 24, 2022

(51) Int. Cl.
*B60R 11/02* (2006.01)
*B60R 11/00* (2006.01)

(52) U.S. Cl.
CPC ....... *B60R 11/02* (2013.01); *B60R 2011/0015* (2013.01); *B60R 2011/0071* (2013.01); *B60R 2011/0085* (2013.01)

(58) Field of Classification Search
CPC ................ B60R 2011/0015; B60R 2011/0071
See application file for complete search history.

(56) References Cited

U.S. PATENT DOCUMENTS 6,966,533 B1   11/2005 Kalis et al.
2012/0120626 A1   5/2012 Akaike
(Continued)

FOREIGN PATENT DOCUMENTS

DE   102012112942 A1   6/2014
EP       2608493 A1   6/2013
(Continued)

OTHER PUBLICATIONS

EP Appl. No. 19809274.4, Office Action, Nov. 17, 2023, 5 pages.
(Continued)

*Primary Examiner* — Brian D Nash
(74) *Attorney, Agent, or Firm* — Kilpatrick Townsend & Stockton LLP (57) ABSTRACT

Support (10) for holding a portable electronic device. The support includes a body (12) having an upper pivot location (18) relative to a passenger seat back, a support structure (22) coupled to the body and extendible below a lower edge of the body. The support structure is shaped to receive a lower edge of the portable electronic device and secure the portable electronic device to the body when the portable electronic device is received by the support structure.

15 Claims, 9 Drawing Sheets

(56) References Cited

U.S. PATENT DOCUMENTS

| | | | |
|---|---|---|---|
| 2012/0312847 A1* | 12/2012 | LaColla | B60R 11/02 |
| | | | 224/275 |
| 2014/0198473 A1* | 7/2014 | Shah | F16M 11/041 |
| | | | 29/428 |
| 2016/0176357 A1 | 6/2016 | Maslakow | |
| 2017/0072872 A1 | 3/2017 | Balmer | |
| 2017/0237843 A1 | 8/2017 | Ackeret et al. | |
| 2018/0065567 A1* | 3/2018 | Osterhoff | B60N 2/64 |
| 2018/0244183 A1* | 8/2018 | Ruiz | F16M 11/38 |
| 2019/0263326 A1* | 8/2019 | Yu | F16M 11/14 |
| 2022/0289118 A1* | 9/2022 | Newbold | B60R 11/02 |
| 2022/0396215 A1* | 12/2022 | Morales | B60R 11/02 |
| 2023/0001835 A1* | 1/2023 | Madrigal | B60N 3/004 |
| 2023/0415898 A1* | 12/2023 | Chavarria Garcia | |
| | | | B64D 11/0638 |

FOREIGN PATENT DOCUMENTS

| | | | |
|---|---|---|---|
| WO | 2011101083 A1 | 8/2011 | |
| WO | 2012128424 A1 | 9/2012 | |
| WO | 2016092509 A1 | 6/2016 | |

OTHER PUBLICATIONS

International Patent Application No. PCT/US2019/059266, International Search Report and Written Opinion, dated Oct. 5, 2020.

* cited by examiner

ADJUSTABLE DEVICE HOLDER

FIELD OF THE INVENTION

The field of the invention relates to support structures attached to passenger seats.

BACKGROUND

On many short haul flights, entertainment systems are not provided in passenger seat backs. To provide entertainment to passengers on these flights, airlines may offer movies and shows that can be accessed wirelessly through the aircraft's in-flight entertainment system and viewed on passengers' personal electronic devices ("PED"). Unfortunately, these seats are not provided with any structure to hold these PEDs.

Furthermore, seats that include In-Flight Entertainment ("IFE") devices for passengers' use do not offer a place for passengers to stow his or her own PEDs. A seat with an IFE could still could include a PED holder if the PED holder is installed without blocking the IFE (e.g., behind the tray table). In this manner, a passenger can use both the IFE and the PED holder at the same time. Thus, there is a need to provide structures built into passenger seats that can hold PEDs and allow passengers to view their devices hands-free.

Current solutions to this problem include a tray that folds down from the passenger seat back. The main disadvantage of these trays are that the deployed position remains the same regardless of whether the passenger seat back is upright or reclined. For example, if a passenger seated in row B places a tablet on the fold down tray, and a seated in row A reclines his seat, the tablet can fall out.

Another solution on the market has a channel built into the passenger's food table. This design puts the tablet close to the passenger's knees, which is outside of the natural viewing angle of the passenger. Another issue with this design is that it limits the size of the devices that can be used with it. If a device is larger than the channel, it would not be compatible.

Yet another solution on the market has a fold out tray and a retaining device that holds a top of the personal electronic device in place. The main disadvantage of this solution is that it also limits the size of the tablet that can used with the holder. Furthermore, the retaining device can be damaged by a passenger.

Thus, there is a need for a solution that allows the personal electronic device to be secured in an adjustable manner that allows the personal electronic device to be viewed from a variety of angles, as well as positioning the personal electronic device in a location that aligns with a natural viewing angle of a passenger, and conserving space above the table holder for other amenity items.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a support for holding a portable electronic device comprises a body having an upper pivot location coupled to a passenger seat back; and a support structure coupled to the body and extendible below a lower edge of the body. The support structure may be shaped to receive a lower edge of a portable electronic device and secure the portable electronic device to the body when the portable electronic device is received by the support structure.

In some embodiments, the body comprises at least one track, and an upper portion of the support structure may be coupled to the at least one track. The at least one track may include a spring device that holds the support structure in a retracted position. The at least one track may further include a locking device engageable to hold the support structure in an extended position. A lower edge of the support structure may be positioned a distance away from the lower edge of the body in the extended position, and may further be positioned between 0 mm-80 mm from the lower edge of the body in the extended position.

In some embodiments, the body comprises at least one attachment device that secures at least one additional region of the portable electronic device to the body.

According to certain embodiments of the present invention, a support for holding a portable electronic device comprises a body having an upper pivot location coupled to a passenger seat back; and at least one attachment device that secures at least two locations on the portable electronic device to the body when the portable electronic device is received by the support structure. The at least one attachment device may include at least one of an upper lip, a lower ledge, or an overlapping member. In some embodiments, the at least one attachment device comprises at least two overlapping members. The at least one attachment device may comprise a lower lip and an upper lip. The portable electronic device may comprise a height ranging from 2 to 11 inches.

According to certain embodiments of the present invention, a support for holding a portable electronic device comprises a body having an upper pivot location coupled to a passenger seat back; and a support structure coupled to the body and extendible below a lower edge of the body. The support structure may be shaped to receive a lower edge of a portable electronic device when the portable electronic device is received by the support structure. The body may include a lip shaped to receive an upper edge of the portable electronic device when the portable electronic device is received by the support structure.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

As best illustrated in FIGS. 1-18, the described embodiments of the invention provide a support 10 for holding a personal electronic device ("PED") 14. In certain embodiments, the support 10 comprises a body 12 that is coupled to a passenger seat back 16.

The body 12 may be coupled to the passenger seat back 16 in multiple locations. For example, the body 12 may comprise an upper pivot location 18, which be located along an upper region of the body 12. In other embodiments, the body 12 may be connected to the passenger seat back 16 in other suitable locations along the body 12 and/or along a surface of the passenger seat back 16.

In some embodiments, the body 12 is connected to the passenger seat back 16 via a pair of torsion hinges 20. The torsion hinges 20 may provide a means to maintain the body 12 in desired position until it is re-positioned. For example, the torsion hinges 20 may allow the body 12 to be adjusted to any suitable angle relative to the passenger seat back 16, ranging from 0 degrees to 180 degrees.

As shown in FIGS. 1-5 and 15-18, the body 12 may further comprise a support structure 22 that is configured to secure the PED 14 to the body 12. In some embodiments, the support structure 22 may comprise a lower ledge 24 that is shaped to receive a lower edge of the PED 14 and secure the PED 14 to the body 12. The lower ledge 24 may have a fixed or adjustable depth to accommodate PEDs 14 of varying thicknesses.

Figure 1:
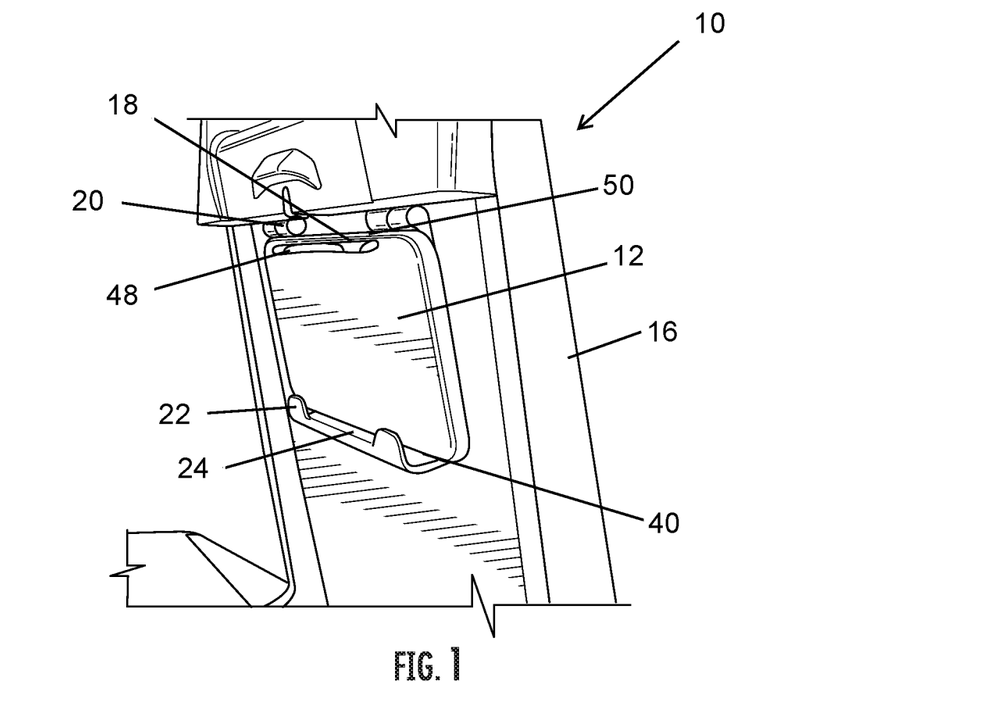
FIG. 1 is a front perspective view of a PED support in a stowed position and a support structure in a retracted position, according to certain embodiments of the present invention.
Figure 2:
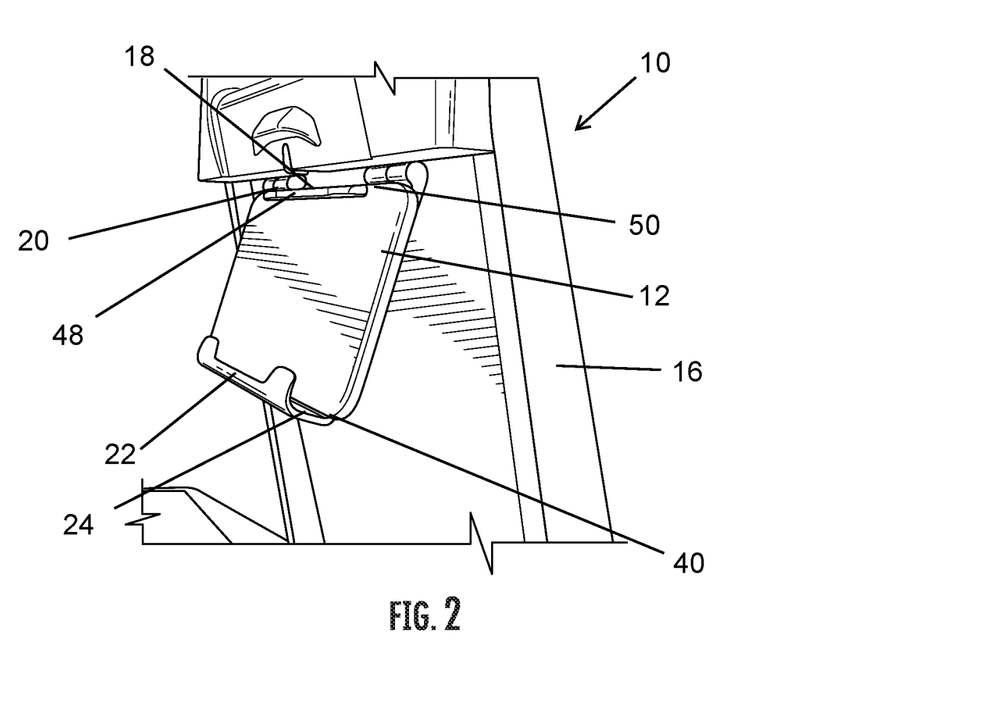
FIG. 2 is a front perspective view of the PED support of FIG. 1 in a deployed position.
Figure 3:
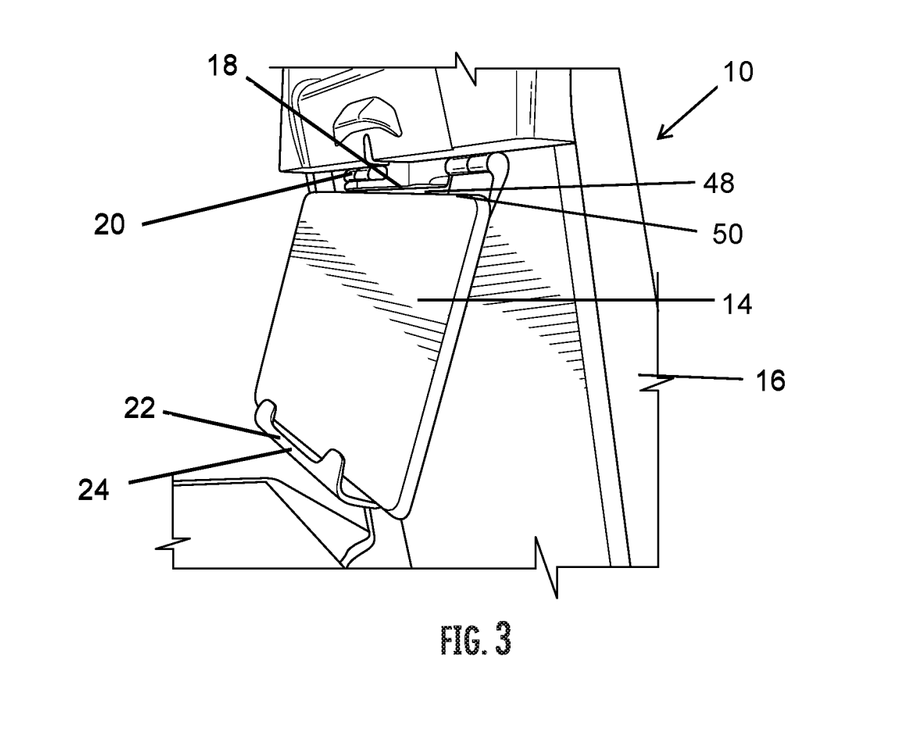
FIG. 3 is a front perspective view of the PED support of FIG. 1, with the support structure in a fully extended position and engaged by a PED.
Figure 4:
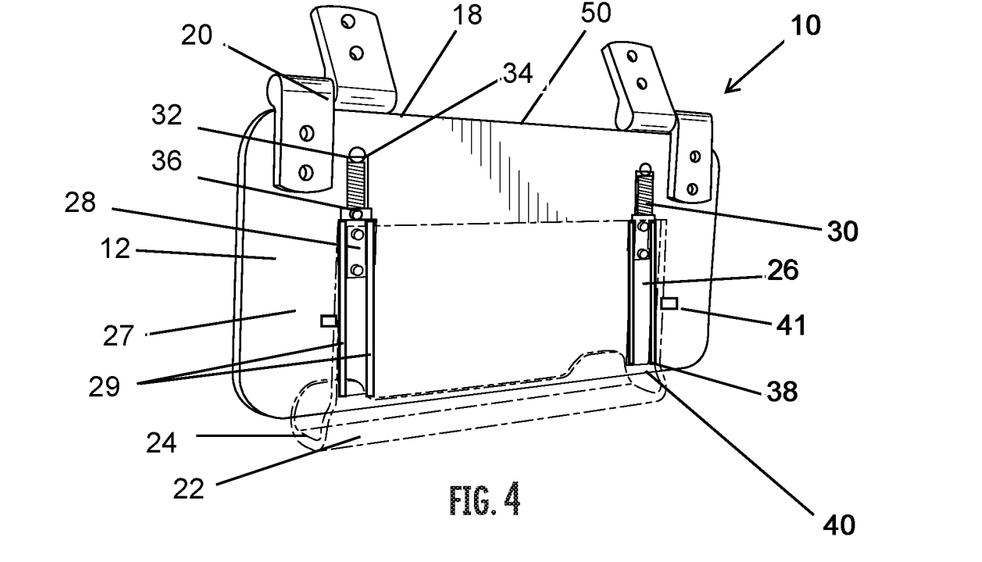
FIG. 4 is a rear perspective view of the PED support of FIG. 1, with the support structure in retracted position.
Figure 5:
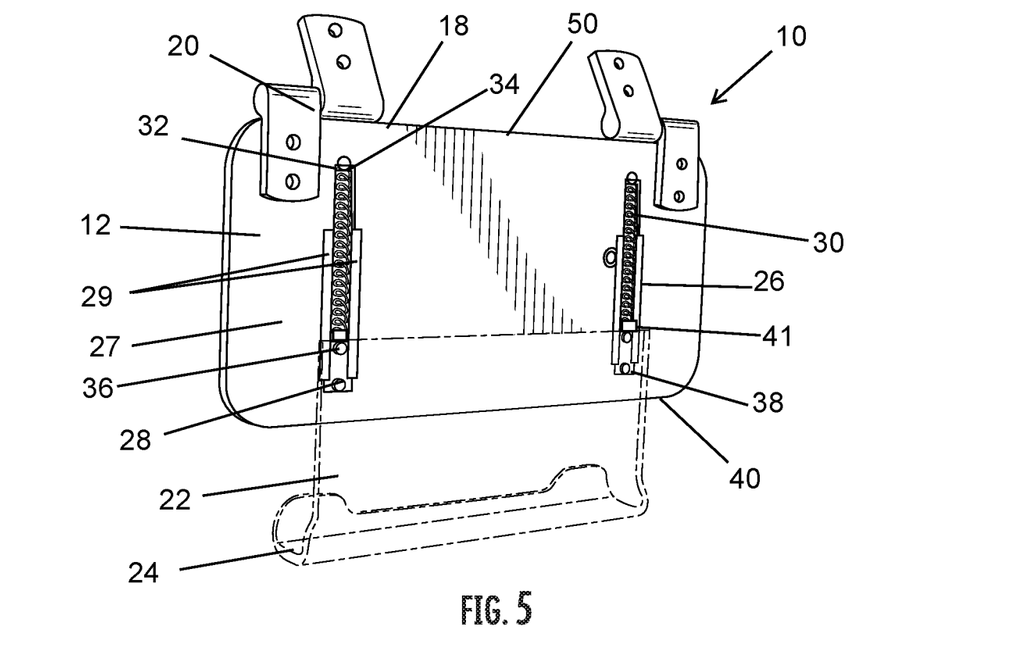
FIG. 5 is a rear perspective view of the PED support of FIG. 1, with the support structure in a fully extended position.

The support structure 22 may be coupled to the body 12 via at least one track 26. For example, as best illustrated in FIGS. 4-5, the track 26 may be positioned within a back surface 27 of the body 12. A connector 28 is positioned within the track 26 and held to the track 26 by a pair of lips 29. As a result, the connector 28 is able to travel along the length of the track 26.

As shown in FIGS. 4-5, a spring device 30 may be positioned at an upper end 32 of the track 26. A first end 34 of the spring device 30 is joined to the upper end 32 of the track 26, and a second end 36 of the spring device 30 is joined to the connector 28. As a result, the connector 28 is pulled to the upper end 32 of the track 26 until a downward force is applied to pull the connector 28 toward a lower end 38 of the track 26. The spring device 30 may be any suitable extension spring, tension spring, gas spring, elastic spring, etc.

The connector 28 may in turn be connected to the support structure 22. As the connector 28 is pulled toward the upper end 32 of the track 26 by the spring device 30, the support structure 22 is likewise pulled upward along the track 26. The length of the track 26 is shaped so that, when the connector 28 positioned at the upper end 32 of the track 26 in a retracted position, the majority of the support structure 22 is positioned behind the body 12 and the lower ledge 24 is positioned adjacent a lower edge 40 of the body 12.

In some embodiments, as best illustrated in FIGS. 1-3 and 17-18, an upper lip 48 may be included along an upper edge 50 of the body 12. The upper lip 48 may overlap an upper edge of the PED 14 to secure the PED 14 to the body 12 when the PED 14 is connected to the body 12 via the support structure 22.

To access the support structure 22, the lower ledge 24 of the support structure 22 is pulled downward by a passenger and an edge of PED 14 is positioned within the lower ledge 24. The weight of the PED 14 itself may be sufficient to hold the support structure 22 in a suitable location along the track 26. In some embodiments, the spring device 30 may have a sufficiently high spring back force that will exceed the amount of force applied by the PED 14, thereby causing the support structure 22 to travel back upward until the PED 14 is pressed against the upper lip 48. The upper lip 48 may extend out at least 8 mm, and could further extend out as far as 12 mm for a PED thickness ranging from 0.1 to 0.5 inches.

In further embodiments, the weight of the PED 14 may be sufficient to cause the connector 28 to travel to the lower end 38 of the track 26 in a fully extended position. In the fully extended position, a lower edge of the support structure may be positioned between 0 mm-80 mm from the lower edge of the body 12. In the fully extended position, the support structure may accommodate a PED 14 ranging from 2-18 inches in width (depending and limited by seat width) and 2-11 inches in height (depending on the space available because the support structure 22 should not touch the food tray in any case when extended, especially when the seat back 16 is reclined. In some embodiments, there should be at least 1 inch of distance between the support structure 22 and the food tray to avoid obstructing food tray usage).

In some embodiments, a locking device 41 may be coupled to the connector 28 and/or to the track 26 to lock the position of the support structure 22 along the track 26 between the retracted and fully extended positions.

According to certain embodiments, as shown in FIGS. 6-18, a front surface of the body 12 may include an attachment device 42. The attachment device 42 may include one or more members 44 that are positioned to overlap at least one region of the PED 14. The attachment device 42 may be used alone to secure PEDs 14 to the body 12 by overlapping at least two regions of the PED 14, as shown in FIGS. 6-14. In other embodiments, the attachment device 42 may be used to overlap at least one region of the PED 14 in combination with the support structure 22 to secure PEDs 14 to the body 12, as shown in FIGS. 15-18.

Figure 6:
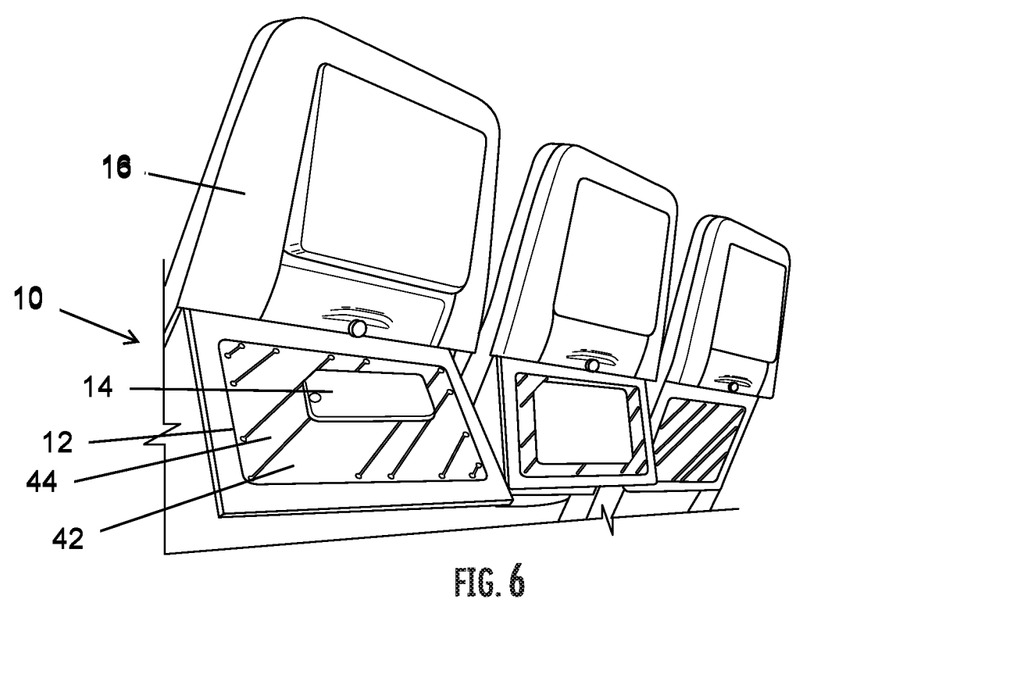
FIG. 6 is a front perspective view of multiple PED supports comprising a plurality of diagonal members and ranging between stowed and varying angles of deployment, according to certain embodiments of the present invention.

In certain embodiments, as shown in FIG. 6, the members 44 are arranged diagonally across the front surface of the body 12 so that one member overlaps one corner of the PED 14 and another member overlaps an diagonally opposing corner of the PED 14. The members 44 may be bands formed of rubber, flexible plastics, and/or natural or synthetic fabrics (e.g. Leather) or other suitable elastic material.

Figure 7:
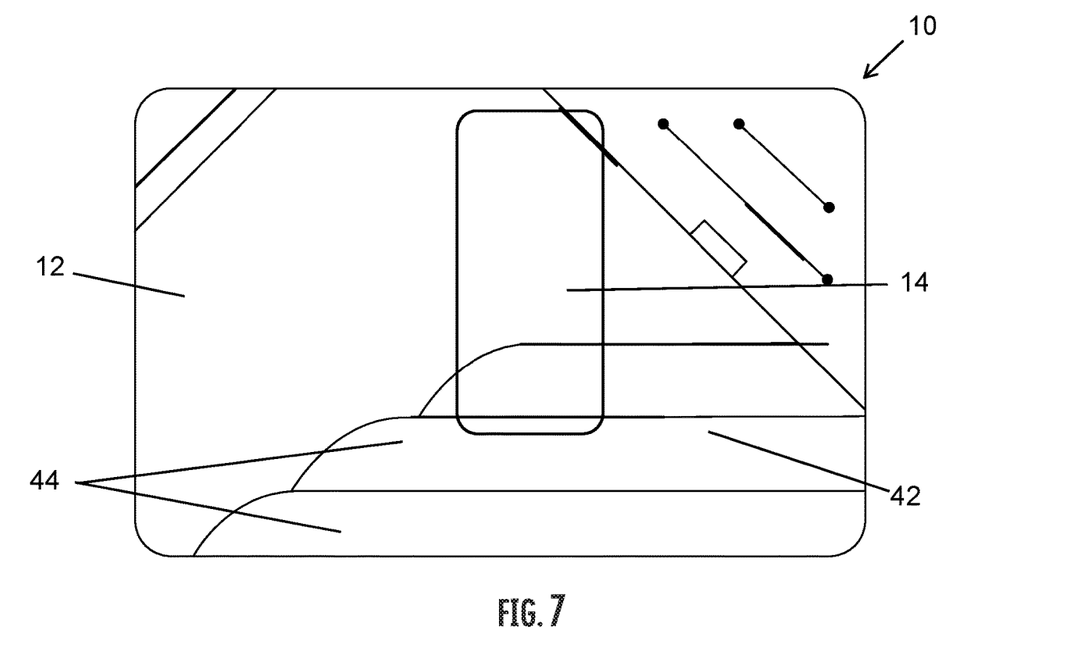
FIG. 7 is a front view of a PED support comprising a plurality of members arranged in diagonal and lateral orientations and engaged by a smaller PED in a vertical orientation, according to certain embodiments of the present invention.
Figure 8:
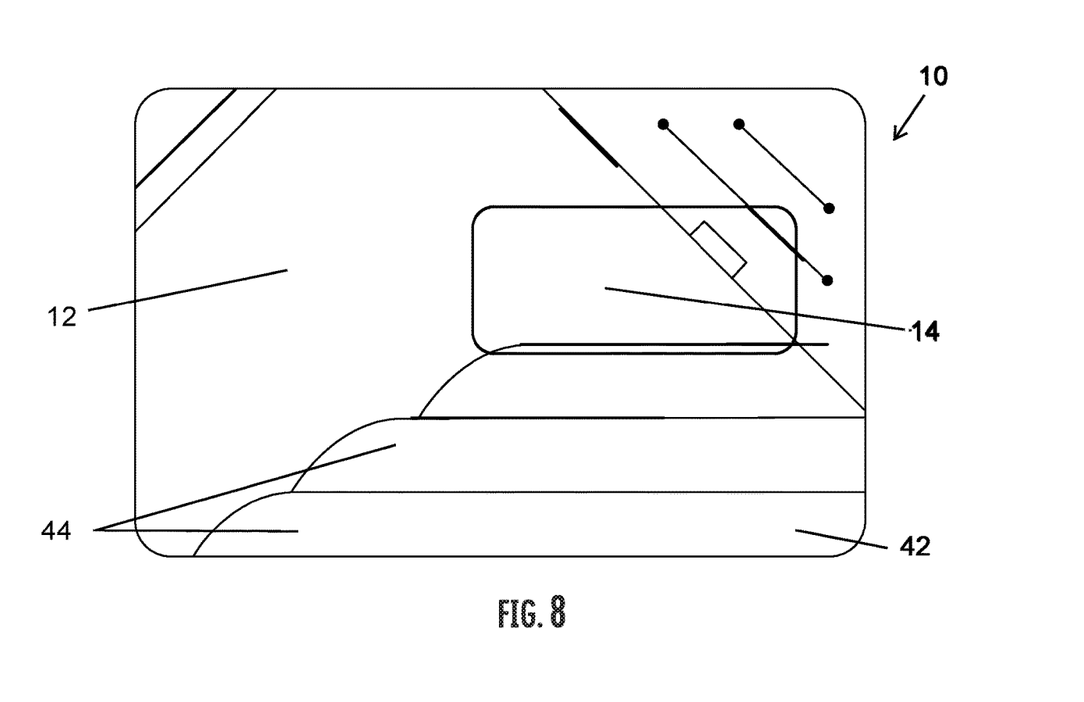
FIG. 8 is a front view of the PED support of FIG. 7 engaged by a smaller PED in a horizontal orientation.
Figure 9:
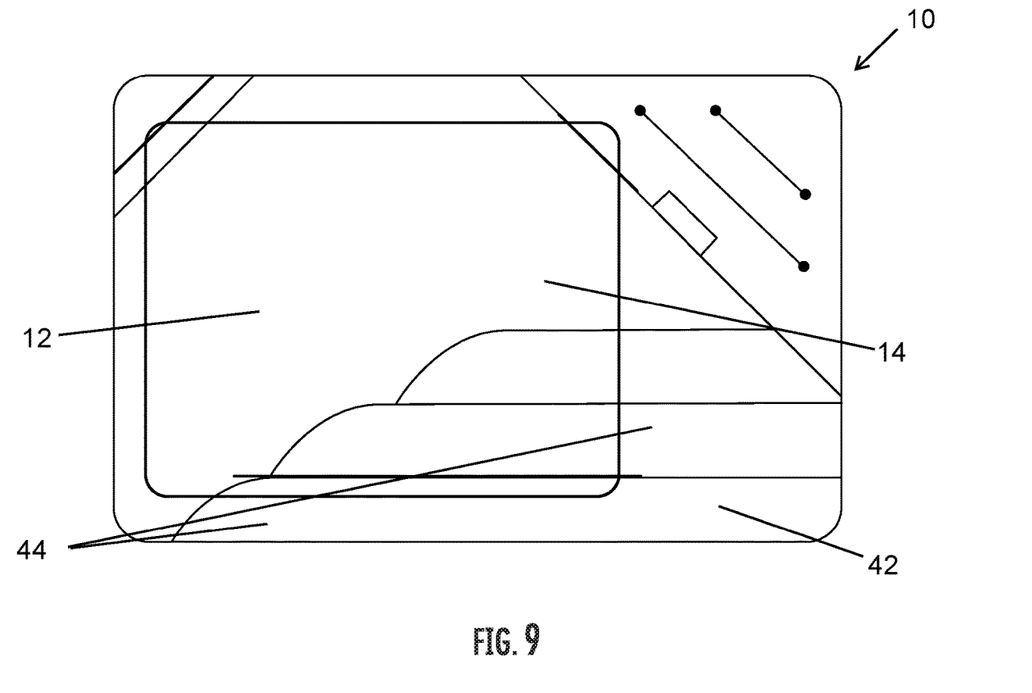
FIG. 9 is a front view of the PED support of FIG. 7 engaged by a larger PED in a landscape orientation.
Figure 10:
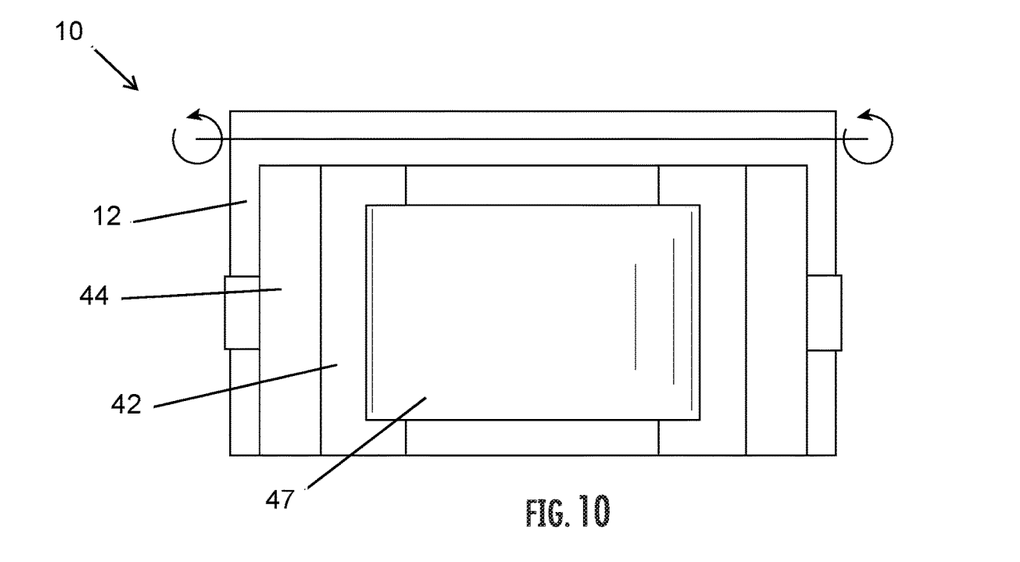
FIG. 10 is a front view of a PED support comprising a plurality of members arranged to overlap opposing ends of a PED, according to certain embodiments of the present invention.
Figure 11:
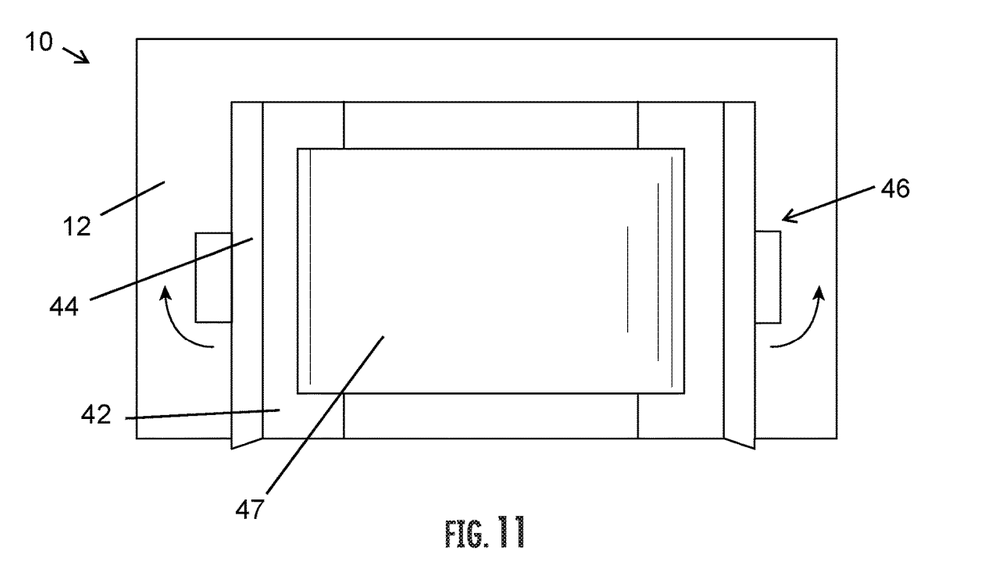
FIG. 11 is front view of the PED support of FIG. 10, with the members in a rotated position to expose a slot.
Figure 12:
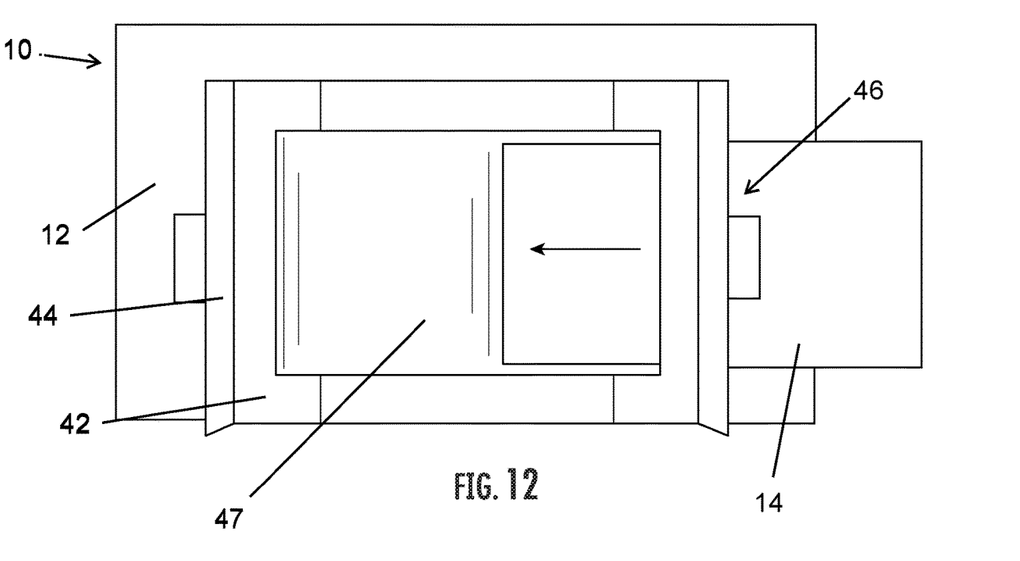
FIG. 12 is a front view of the PED support of FIG. 10, showing a PED being inserted into the slot.
Figure 13:
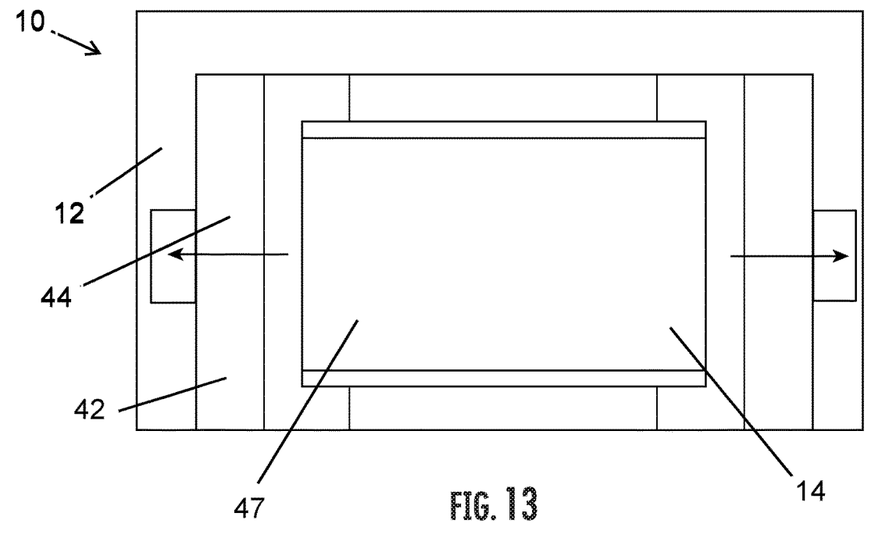
FIG. 13 is a front view of the PED support of FIG. 10, showing the members positioned over the ends of the PED.
Figure 14:
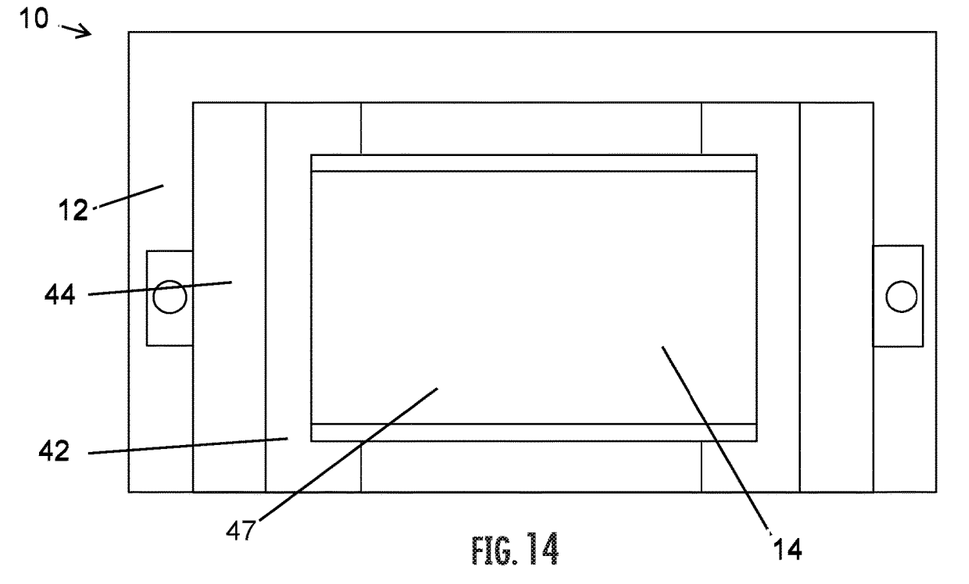
FIG. 14 is a front view of the PED support of FIG. 10, showing the members secured to the body of the PED support.
Figure 15:
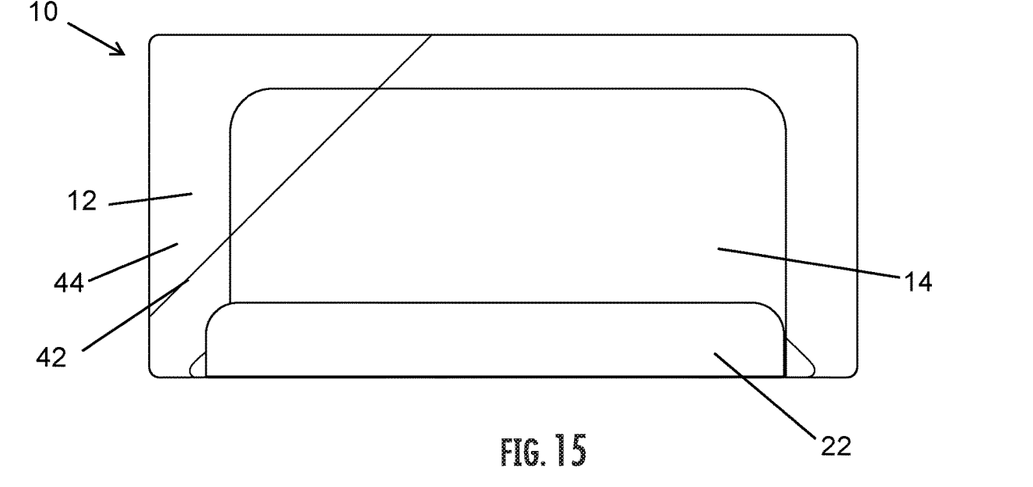
FIG. 15 is a front view of a PED support showing a PED engaged with a support structure and a diagonally-overlapping member, according to certain embodiments of the present invention.
Figure 16:
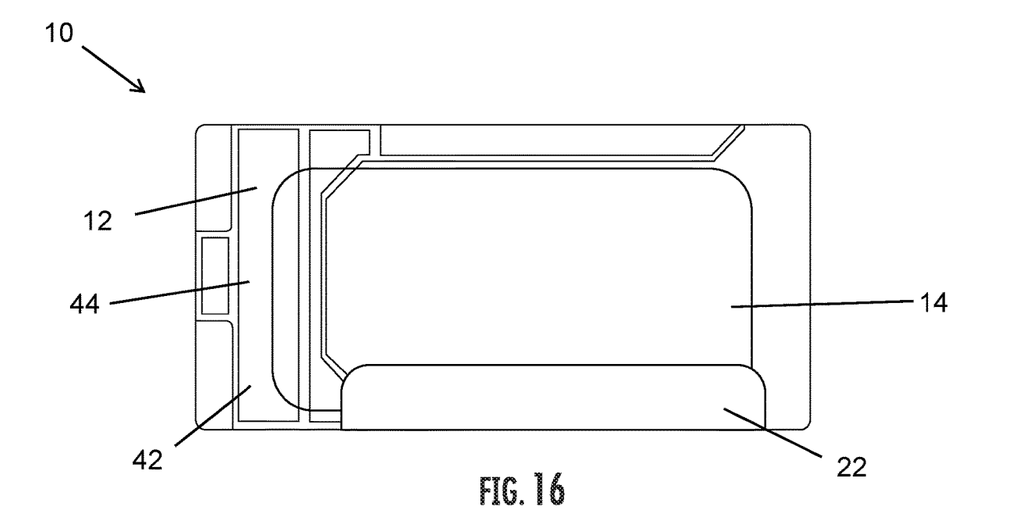
FIG. 16 is a front view of the PED support showing a PED engaged with a support structure and a side-overlapping member.
Figure 17:
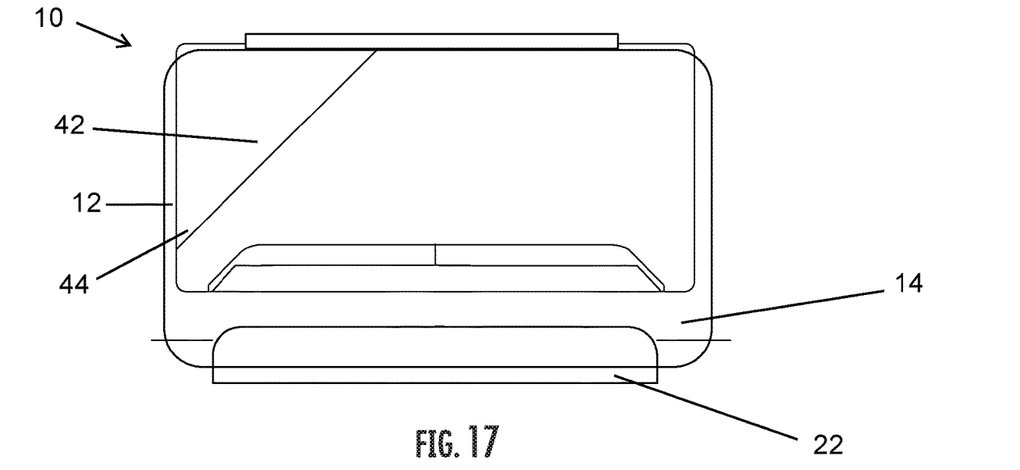
FIG. 17 is a front view of the PED support showing a larger PED engaged with a support structure and an upper lip, while a diagonally-overlapping member is disengaged behind the PED.
Figure 18:
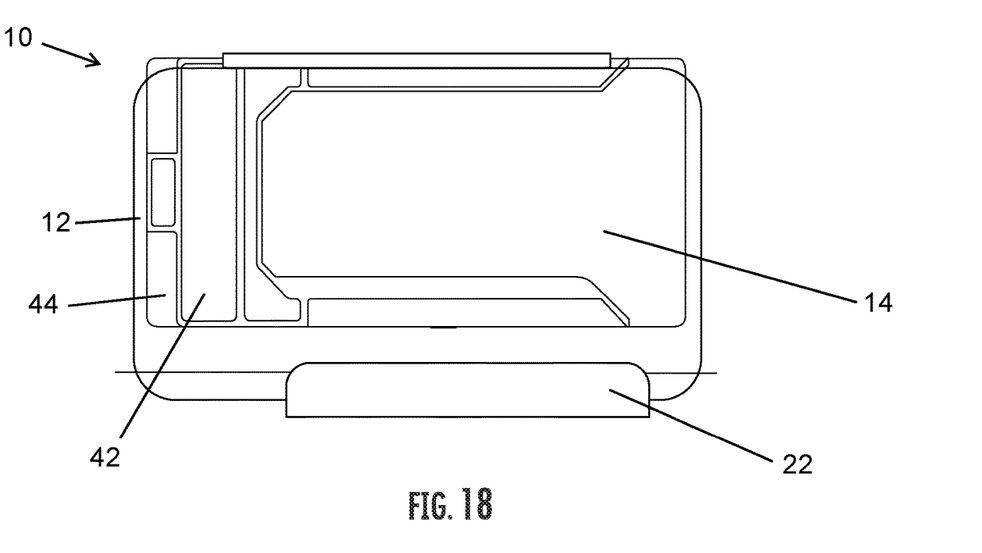
FIG. 18 is a front view of the PED support showing a larger PED engaged with a support structure and an upper lip, while the side-overlapping member is disengaged behind the PED.

In other embodiments, as shown in FIGS. 7-9, the members 44 may be arranged diagonally and laterally across the front surface of the body 12 so that one member overlaps one corner of the PED 14 and another member overlaps a lower edge of the PED 14.

In yet other embodiments, as shown in FIGS. 10-14, the members 44 may be arranged to overlap opposing ends of the PEDs 14. In these embodiments, one or both members 44 are rotated away from the body 12 to expose a slot 46. The PED 14 is inserted through the slot 46. Once the PED 14 is contained within the slot 46, one or both members 44 are rotated back and secured to the body 12. The PED 14 is then accessible through an opening 47 in the slot 46.

In the following, further examples are described to facilitate the understanding of the invention:

Example A

A support for holding a portable electronic device comprising
a body having an upper pivot location coupled to a passenger seat back; and
a support structure coupled to the body and extendible below a lower edge of the body;
wherein the support structure is shaped to receive a lower edge of a portable electronic device and secure the portable electronic device to the body when the portable electronic device is received by the support structure.

Example B

The support of any of the preceding or subsequent examples, wherein the body comprises at least one track.

Example C

The support of any of the preceding or subsequent examples, wherein an upper portion of the support structure is coupled to the at least one track.

Example D

The support of any of the preceding or subsequent examples, wherein the at least one track comprises a spring device that holds the support structure in a retracted position.

Example E

The support of any of the preceding or subsequent examples, wherein the at least one track comprises a locking device engageable to hold the support structure in an extended position.

Example F

The support of any of the preceding or subsequent examples, wherein a lower edge of the support structure is positioned a distance away from the lower edge of the body in the extended position.

Example G

The support of any of the preceding or subsequent examples, wherein a lower edge of the support structure is positioned between 0 mm-80 mm from the lower edge of the body in the extended position.

Example H

The support of any of the preceding or subsequent examples, wherein the body comprises at least one attachment device that secures at least one additional region of the portable electronic device to the body.

Example I

A support for holding a portable electronic device comprising:
a body having an upper pivot location coupled to a passenger seat back; and
at least one attachment device that secures at least two locations on the portable electronic device to the body when the portable electronic device is received by the support structure;
wherein the at least one attachment device comprises at least one of an upper lip, a lower ledge, or an overlapping member.

Example J

The support of any of the preceding or subsequent examples, wherein the at least one attachment device comprises at least two overlapping members.

Example K

The support of any of the preceding or subsequent examples, wherein the at least one attachment device comprises a lower lip and an upper lip.

Example L

The support of any of the preceding or subsequent examples, wherein the portable electronic device comprises a height ranging from 2 to 11 inches.

Example M

A support for holding a portable electronic device comprising:
- a body having an upper pivot location coupled to a passenger seat back; and
- a support structure coupled to the body and extendible below a lower edge of the body;
- wherein the support structure is shaped to receive a lower edge of a portable electronic device when the portable electronic device is received by the support structure; and
- wherein the body comprises a lip shaped to receive an upper edge of the portable electronic device when the portable electronic device is received by the support structure.

Example N

The support of any of the preceding or subsequent examples, wherein the body comprises at least one track.

Example O

The support of any of the preceding or subsequent examples, wherein an upper portion of the support structure is coupled to the at least one track.

Example P

The support of any of the preceding or subsequent examples, wherein the body comprises a spring device that positions a lower edge of the support structure adjacent the lower edge of the body in a retracted position.

Example Q

The support of any of the preceding or subsequent examples, wherein the at least one track comprises a device engageable to hold the support structure in an extended position.

Example R

The support of any of the preceding or subsequent examples, wherein a lower edge of the support structure is positioned a distance away from the lower edge of the body in the extended position.

Example S

The support of any of the preceding or subsequent examples, wherein a lower edge of the support structure is positioned between 0 mm-80 mm from the lower edge of the body in the extended position.

Example T

The support of any of the preceding or subsequent examples, wherein the body comprises at least one attachment device that secures at least one additional region of the portable electronic device to the body.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A support for holding a portable electronic device comprising:
    a body having an upper location located along an upper region of the body and configured to be pivotably coupled to a passenger seat back; and
    a support structure coupled to the body and extendible below a lower edge of the body;
    wherein the support structure is shaped to receive a lower edge of a portable electronic device and secure the portable electronic device to the body when the portable electronic device is received by the support structure,
    wherein the body comprises at least one track,
    wherein an upper portion of the support structure is coupled to the at least one track, and
    wherein the at least one track comprises a locking device engageable to hold the support structure in an extended position.

2. The support of claim 1, wherein the at least one track comprises a spring device that holds the support structure in a retracted position.

3. The support of claim 1, wherein a lower edge of the support structure is positioned a distance away from the lower edge of the body in the extended position.

4. The support of claim 1, wherein a lower edge of the support structure is positioned between 0 mm-80 mm from the lower edge of the body in the extended position.

5. The support of claim 1, wherein the body comprises at least one attachment device that secures at least one additional region of the portable electronic device to the body.

6. The support of claim 1, further comprising: at least one attachment device configured to secure at least two locations on the portable electronic device to the body when the portable electronic device is received by the support structure by overlapping the portable electronic device such that at least a portion of the portable electronic device is between the body and the at least one attachment device; wherein the at least one attachment device comprises at least one of an upper lip, a lower ledge, or an overlapping member.

7. The support of claim 6, wherein the at least one attachment device comprises at least two overlapping members.

8. The support of claim 6, wherein the at least one attachment device comprises a lower lip and an upper lip.

9. The support of claim 6, wherein the portable electronic device comprises a height ranging from 2 to 11 inches.

10. The support of claim 1, wherein the body comprises a lip shaped to receive an upper edge of the portable electronic device when the portable electronic device is received by the support structure and overlap the portable electronic device such that at least a portion of the portable electronic device is between the body and the lip.

11. The support of claim 10, wherein the body comprises a spring device that positions a lower edge of the support structure adjacent the lower edge of the body in a retracted position.

12. The support of claim 10, wherein the at least one track comprises a device engageable to hold the support structure in an extended position.

13. The support of claim 12, wherein a lower edge of the support structure is positioned a distance away from the lower edge of the body in the extended position.

14. The support of claim 12, wherein a lower edge of the support structure is positioned between 0 mm-80 mm from the lower edge of the body in the extended position.

15. The support of claim 10, wherein the body comprises at least one attachment device that secures at least one additional region of the portable electronic device to the body.

* * * * *